United States Patent [19]
Fukushima

[11] Patent Number: 6,049,394
[45] Date of Patent: Apr. 11, 2000

[54] COLOR PRINT SYSTEM, COLOR PRINTER, AND A COMPUTER READABLE-RECORDING MEDIUM WITH A COMPUTER-EXECUTIVE PROGRAM STORED THEREIN

[75] Inventor: Tokutaro Fukushima, Kanagawa, Japan

[73] Assignee: Ricoh Company, Ltd., Tokyo, Japan

[21] Appl. No.: 09/061,246

[22] Filed: Apr. 17, 1998

[30] Foreign Application Priority Data

Apr. 18, 1997 [JP] Japan ..................................... 9-102310
Apr. 6, 1998 [JP] Japan .................................. 10-093585

[51] Int. Cl.⁷ ..................................................... B41B 15/00
[52] U.S. Cl. ........................ 358/1.9; 358/1.15; 358/1.16; 358/1.17; 358/1.18; 358/500
[58] Field of Search ..................................... 395/101–117; 358/500–504, 1.9, 1.15, 1.16, 1.17, 1.18

[56] References Cited

U.S. PATENT DOCUMENTS

| | | | |
|---|---|---|---|
| 5,249,061 | 9/1993 | Nagashima et al. ..................... | 358/296 |
| 5,377,013 | 12/1994 | Oka et al. ................................ | 358/332 |
| 5,661,574 | 8/1997 | Kawana .................................... | 358/501 |
| 5,675,717 | 10/1997 | Yamamoto ............................... | 395/109 |
| 5,724,089 | 3/1998 | Nagumo et al. ......................... | 347/247 |
| 5,768,487 | 6/1998 | LeClair et al. ........................... | 395/116 |
| 5,822,510 | 10/1998 | LeClair et al. ........................... | 395/116 |
| 5,832,192 | 11/1998 | Hino ........................................ | 395/115 |
| 5,930,464 | 7/1999 | Nakayama et al. ..................... | 395/114 |

FOREIGN PATENT DOCUMENTS

| | | |
|---|---|---|
| 8-123633 | 5/1996 | Japan . |
| 8-186724 | 7/1996 | Japan . |

*Primary Examiner*—Kimberly A. Williams
*Assistant Examiner*—Derrick Fields
*Attorney, Agent, or Firm*—Oblon, Spivak, McClelland, Maier & Neustadt, P.C.

[57] ABSTRACT

A printer driver in a host computer sends color image data by each color component to a color printer controller, a CPU of the printer controller develops the received color image data by each color component in a RAM, and issues a printing start instruction via an engine I/F to a color printer engine each time development of image data for one color or a plurality of colors is finished to start printing, and at the same time starts development of image data for a next color, thus a video DMA operation and development of image being concurrently executed.

18 Claims, 14 Drawing Sheets

DENSITY

A: K=30/255
C=10/255
M=100/255
Y=30/255

B: K=0/255
C=100/255
M=10/255
Y=0/255

C: K=200/255
C=0/255
M=0/255
Y=0/255

A4

A4

A3

COLOR PRINT SYSTEM, COLOR PRINTER, AND A COMPUTER READABLE-RECORDING MEDIUM WITH A COMPUTER-EXECUTIVE PROGRAM STORED THEREIN

FIELD OF THE INVENTION

The present invention relates to a color print system, a color printer, and a computer readable-recording medium with a computer-executable program stored therein, and more particularly to a color print system which enables a higher speed in processing for printing a color print, when printing with a color printer, by sending image data from a printer driver according to a printing system for multiple color printing, a color printer, and a computer-readable recording medium with a computer-executable program stored therein.

BACKGROUND OF THE INVENTION

In a color print system based on the conventional technology, when a color image is printed, color image data prepared on a host computer is generally based on three elementary colors of R, G and B, but color image data printed with a color printer is based on CMY inks (or toners), so that image processing such as CMY conversion or color correction is required. Also to obtain a pseudo full color image, sometimes it is required to lower a gradation of an input image to a lower one with an output grading capability of a printer engine.

As a color print system conventionally proposed, there are ones disclosed, for instance, Japanese Patent Laid-Open Publication No. HEI 8-123633 or Japanese Patent Laid-Open Publication No. HEI 8-186724.

Next description is made for the color print system disclosed in Japanese Patent Laid-Open Publication No. HEI 8-123663 with reference to FIG. 14 to FIG. 17.

FIG. 14 is a block diagram showing configuration of the color print system disclosed in Japanese Patent Laid-Open Publication No. HEI 8-123633.

The color print system shown in FIG. 14 comprises a host computer 5 for preparing image data, a color printer controller 6 for having image data printed by controlling a color printer engine 7, and a color printer engine 7 for printing the image data. Also the color printer controller 6 comprises a host I/F 61, a CPU 62, a ROM 63, a RAM 64, and an engine I/F 65 or the like. The color printer comprises the color printer controller 6 and the color printer engine 7.

Next a description is made for operations of the color print system shown in FIG. 14.

At first, in the host computer 5, color image data to be printed is prepared according to an input operation by a user. Also the color image data is expressed with color formats such as RGB or CMYK. Further there are cases where prepared color image data is for forms with different sizes, where the color image data can not always be accommodated in a sheet of form, or where a plurality of copies are to be prepared.

Next when an instruction for printing the prepared color image data is issued upon an input operation by the user on the host computer 5, the color image data is sent to software stored inside the host computer 5 and called as printer driver.

In the printer driver, to respond to a difference of configuration of a connected printer, the color image data is converted to data with a format which the color printer controller 6 can interpret, and the color image data is sent to the host I/F 61 inside the color printer controller 6. More specifically, in the printer driver, in a case of color image data, data specifying degrees of densities of R, G and B (or C, M, Y, K) in each of characters, graphics, or images to be printed is sent to the color printer controller 6.

In the color printer controller 6, when color image data is sent from the host computer 5, the host I/F 61 receives the color image data, and once stores the color image data in a receiving buffer inside the host I/F 61 (it should be noted that a receiving buffer may not be provided in the host I/F 61 and the RAM 64 may be used in place of a receiving buffer).

Then the CPU 62 develops the color image data stored in the receiving buffer in the RAM 64 as the image data similar to, for instance, a result of output after printing as shown in FIG. 15 according to a program (instruction code) stored in the ROM 63. In the example shown in FIG. 15, the characters of "ABC" are developed in the RAM 64. In this example, only text data is shown, but also graphic data or image data is similarly developed as an image to be printed. When received data is color image data, as a full-color expression is made by overlaying 4 colors of CMYK in a color printer engine such as that based on an electronic photographing system, also the color image data developed in the RAM 64 has image data areas for 4 colors (4 plains) each to store therein a density value for each color component.

Then the CPU 52 executes communications via the engine I/F 65 with the color printer engine 7 at a point of time when full-color image data for one page has been developed in the RAM 64, reports to the engine I/F 65 that development of the image has been finished, and outputs an instruction for start of printing to the color printer engine 7.

When the color printer engine 7 starts its operation, the engine I/F 65 executes a video DMA operation, and sends the color image data developed in the RAM 64 to the color printer to have the color image data printed.

It should be noted that, as 4 colors are generally superimposed in a color printer engine based on the electronic photographing system, at first an image for one color component (toner image) is formed on a photo-sensitive body, then the color image data for one color formed on the photo-sensitive body is transferred onto an intermediate transfer belt (also sometimes called intermediate transfer drum), then a color image data for the next color component is formed and transferred to the intermediate transfer belt, and thus color image data for 4 color components is formed and transferred to the intermediate belt, and the toner images are finally transferred onto printing paper. Namely, as fill-color printing is made possible by forming and transferring images 4 times, color image data having been subjected to a video DMA operation or developed in the RAM 64 is managed by each color component.

When a plurality of pages are to be printed, a printer driver in the host computer 1 at first sends full-color image data for a first one page to the host I/F 61 in the color printer controller 6, and then notices the host I/F 61 of an end of one page by sending code indicating that transfer of image data for one page is finished and transfer of image data for a new page starts. Then the printer driver sends color image data for the next one page to the color printer controllers and repeats the operation for the subsequent pages.

Next a description is made for a band system of transferring color image data for one page by dividing the color image data to a plurality of bands in the auxiliary scanning direction with reference to FIG. 16 and FIG. 17.

For instance, when the color image data as shown in FIG. 16 is transferred from the host computer 5 and is developed in the RAM 64 in the printer controller 6, as shown in FIG. 17, color image data for one page is divided by a printer driver in the host computer 5 to a plurality of bands 1 to N (N: integral number of 2 or more) in the auxiliary scanning direction, at first color image data in the band 1 is transferred (it should be noted that, in this example, as there is no color image data to be printed in the band 1, only a color image data end command is sent), and then color image data in the band 2 is transferred.

In this case, in the band 2, such information as coordinates, font, and color density (RGB or CMYK) inside the band of the text data of "A" is sent out. It should be noted that, although FIG. 16 shows a case where text data is sent, in a case of image data, coordinates of points where the image is adhered and color image data (densities of color of each pixel) is sent out, and in a case of graphic data, such information as coordinates of points where the graphic data is adhered, a form of the graphic data, and density of colors to be painted is sent out.

In FIG. 17, in a case of color image data spread over a plurality of bands (band 2 and band 3) such as a character of, for instance, "B", at first the color image data is developed as data in a band previously sent in the side of the color printer controller 6, and then is stored as color image data for the next band in a buffer. In the side of host computer 5, when sending out color image data in the next band, the transfer operation is executed by developing the color image data by means of issuing an instruction of placing the color image data in a latter half section of the previous band (The instruction of placing color image data for a latter half section of the character of "B" in the next band in a latter half section of the previous band is issued because it is necessary to specify top and bottom of each image when a plurality of images are superimposed to each other).

Color image data up to the band N is sent by repeating the operations as described above, and then the processing in the host computer 5 is finished. Then, in the color printer controller 6 having received a print instruction, the CPU 62 starts development of color image data in each band from those in the band 1, and this operation is successively repeated up to the color image data in the band N. In this case, however, the color image data may be compressed in the RAM 64 or in a full-bit map according to a system of the color printer controller 6.

In the color printer controller 6 based on the display list system, the color image data for each of the characters as shown in FIG. 16 is divided to display code for each character (text data, image data, and graphic data for each character), and the display code for each character is developed.

Next a description is made for the color printer system disclosed in Japanese Patent Laid-Open Publication No. HEI 8-186724.

The color print system disclosed in Japanese Patent Laid-Open Publication No. HEI 8-186724 comprises a host computer and a printer.

The host computer temporally stored color image data in a work memory, and supplies the stored lusterized data via a job-partition method deciding section to the printer driver. The printer driver has an edge emphasizing section, an expanding/compressing section, a color correcting section, a finalizing section, and an RGB to CMY conversion section, and converts the lusterized data to color image data for printer output suited to the printer.

These image processing sections (edge emphasizing section, expanding/compressing section, color correcting section, finalizing section, and RGB to CMY conversion section) are also provided in a printer.

The job-partition method deciding section decides partition of a job between a host computer and a printer according to an image type based on a result of preliminary measurement executed for each image type, so that a waiting time for image processing is reduced and also a time required for print processing is reduced.

Namely, the host computer and color printer controller have common image processing units respectively, and take partial charge of an job respectively according to a image type.

Further there has been developed a color printer in which a maximum form size of a form available in the printer is, for instance, A3, and when an image with a size of A4 is printed by several copies, an area of a photo-sensitive body and that of an intermediate transfer belt of a color electronic picture printer engine are divided to two portions each with a size of A4 form as shown in FIG. 18. With this color printer, when transferring color image data, as shown in FIG. 19, after color image data for K for a first page is printed, color image data for K for a second page is printed, and then an image for C for a first page, an image for C for a second page, and . . . an image for Y for a second page are successively transferred and printed to make the printing speed higher.

This color printer is based on the electronic photographing system, and when a maximum size of a form available in the printer is A3, it is required that the photo-sensitive body and intermediate transfer belt are always applicable for a form having a size of A3 or more, and for this reason even when a form having a size smaller than A3 such as a form of A4 is printed, the printing speed is the same as that employed when a form with a size of A3 is printed, so that two sheet of A4 forms can be printed within a time required for printing one sheet of A3 size.

In the example described above, the printing order is always in the order of K, C, M and Y, but the sequence is not always required to be in this order, and also in the example described above, it is assumed that the maximum form size is A3, but the maximum form size is not always required to be A3, so that the number of sheets of form printed within a time required for printing a form with a size of A3 is not always limited to two sheets.

In the color print systems based on the conventional technology as described above, CMYK or RGB color information is sent in batch as color image data from a host computer to a color printer controller, so that, when a plurality of copies are to be made, printing of a first page will disadvantageously be delayed.

More specifically, in a case of a color printer engine based on a high speed electronic photographing system, in spite of the fact that a time of around 4 seconds is required for printing for one color component, the host computer 1 sends out color image data for all color components in batch to the color print controller, and the color printer controller 2 processes the RGB or CMYK color information sent thereto in batch, namely issues an instruction for start of printing to the color printer engine after color image data for all color components has been developed in a memory, so that printing of a first page will disadvantageously be delayed.

Similarly, even if the band processing is executed when sending color image data from a color printer driver to a color printer controller as described above, a print start instruction is outputted to the color printer engine after the final band within a page has been developed in a memory, so that the band processing and print processing can not be executed concurrently, and when a plurality of copies are to be printed, printing of a first page will disadvantageously be delayed.

Further, when a color printer engine enabling simultaneous printing of two sheets, at a point of time when color image data for two pages has been developed, the color printer controller is required to issue a print start instruction to the color printer engine, so that a printing speed for a first page when two sheets are printed in batch is slower as compared to that when one sheet is printed.

SUMMARY OF THE INVENTION

It is a first object of the present invention to provide a color print system which enables high speed print processing for color image data.

It is a second object of the present invention to provide a color print system which enables high speed print processing when color image data is outputted for printing on a plurality sheets of forms.

It is a third object of the present invention to provide a color print system which enables high speed print processing by concurrently executing a printing operation and an image developing operation at a high efficiency without causing any print error.

With the print system according to the present invention, a printer driver unit sends color image data by each color component to a color printer controller, and a memory control unit develops received color image data for each color component in a memory unit, so that, at a point of time when image data for a first color has been developed, a printing operation by a color printer engine can be started, and when color image data is outputted for printing by the color printer engine, print output for one color and development of image data for any of other colors which are to be printed subsequently and on can concurrently be executed, and for this reason print processing for color image data can be executed at a high speed.

With the color print system according to the present invention, the printer driver unit converts color image data to data with a color format which a color printer engine can print and sends the color image data by each color component to a color printer controller, while the memory control unit develops the received color image data by each color component in a memory unit, so that, in a case where image data prepared by a host computer is expressed with an RGB format, by converting the RGB color image data to CMYK color image data and then sending the color image data to a color printer controller, a printing operation by the color printer engine can be executed at a point of time when development of color image data for a first color is finished, and when color image data is outputted for printing by the color printer engine, printing for a color and development of image data for any of other colors which are to be printed subsequently and on can concurrently be executed, which enables high speed print processing. This feature is especially useful when processing color image data based on RGB data.

With the color print system according to the present invention, the printer driver divides color image data to a plurality of bands in the auxiliary scanning direction, and sends the divided bands for each color component to the color printer controller, while the memory control unit develops each band of the received color image data by each color component in the memory unit, so that, even when a printer driver system, in which the band processing for each of 4 colors in the auxiliary scanning direction is executed independently, is used, at a point of time when development of image data for a first color is finished, a printing operation by the color printer engine can be started, and when color image data is outputted for printing by the color printer engine, printing for a color and development of image data for any of other colors which are to be printed subsequently and on can concurrently be executed, which enables high speed print processing.

With the color print system according to the present invention, there is provided a color printer engine which can output color image data for a plurality sheets of form for printing in colors by means of executing a printing operation once, and the printer driver unit sends the prepared color image data for a plurality sheets of form by each color component to the color printer controller, while the memory control unit develops the received color image data for a plurality sheets of form by each color component in a memory unit, so that, when a color printer engine enabling printing of a plurality sheets of form by executing a printing operation once is used, printing can be executed without delaying a time for first print, which enables high speed print processing when color image data for a plurality sheets of form is outputted for printing.

With the color print system according to the present invention, there is provided a color printer engine which enables output of color image data for printing in colors by executing a printing operation once, and the printer driver unit divides the prepared color image data for a plurality sheets of form to a plurality of bands in the auxiliary direction and sends out the divided bands by each color component to the color printer controller, while the memory control unit develops the received color image data for a plurality sheets of form by each color component in a memory unit, so that, when a color image or color images are printed by a plurality of copies, the print processing is simplified by subjecting the color image data for a plurality sheets of form to the band processing in batch, which enables high speed print processing when color image data for a plurality sheets of form is outputted for printing.

With the color print system according to the present invention, there is provided a color printer engine which enables output of color image data for printing in colors by executing a printing operation once, and the printer driver unit divides the prepared color image data for a plurality sheets of form to display codes and sends out the divided display codes by each color component to the color printer controller, while the memory control unit develops the received color image data for a plurality sheets of form by each color component in a memory unit, so that, in a case where color image data is sent out from the host computer to the color printer controller with the display list format, the printing processing is simplified by separating the display code for each of text data, image data and graphic data by each color when a color image or color images are printed by a plurality of copies, which enables high speed print processing when color image data for a plurality sheets of form is outputted for printing.

With the color print system according to the present invention, the printer driver unit sends out color image data by each color component to the color printer controller, and sends a printer start command instructing change of timing for starting a printing operation of the color printer engine to the color printer controller taking into account complicity of the color image data and a printing speed of the color printer engine, while the memory control unit develops the received color image data by each color component in a memory unit, and a timing switching unit switches a timing for starting an printing operation of the color printer engine according to the printer start command, so that it is possible to determine at what point of time a print start instruction may be issued to the color printer engine after the color printer controller has developed image data for each color component by taking into account complicity of image data to be outputted for printing, and also it is possible to reduce a frequency of generation of print underrun and to execute a printing operation and development of image data concurrently, which enables high speed print processing without generating a print error.

With the color printer according to the present invention, a memory control unit develops color image data inputted by each color component in a memory unit by each color component, so that, when image data for a first color has been developed, a printing operation of the color printer engine can be started, and when color image data is outputted for printing by the color printer engine, printing for a color and development of image data for any of other colors which are to be printed subsequently and on can concurrently be executed, which enables high speed output of color image data for printing.

With the color printer according to the present invention, a memory control unit develops color image data having been converted to color data with a format which the color printer engine can print and inputted by each color component in a memory unit by each color component, so that, when image data prepared by a cost computer is those expressed with RGB format, by converting the image date to CMYK data and then sending out the data to the color printer controller, at a point of time when development of color image data for a first color is finished, a printing operation by the color printer engine can be started, and when color image data is outputted for printing by the color printer engine, printing for a color component and development of image data for any of other colors which are to be printed subsequently and on can concurrently be executed, which enables high speed print processing. This feature is especially effective when the color image data is RGB data.

With the color printer according to the present invention, the memory control unit develops each band of image data having been divided to a plurality of bands in the auxiliary scanning direction with the divided bands inputted by each color component in a memory unit by each color component, so that, also when using a printer drive system in which band processing is executed by executing band processing for each of 4 color components in the auxiliary scanning direction independently, at a point of time when development of image data for a first color component is finished, a printing operation by the color printer engine can be started, and also when color image data is outputted for printing by the color printer engine, printing for a color component and development of image data for any of other colors which are to be printed subsequently and on can concurrently be executed, which enables high speed output of color image data for printing.

With the color printer according to the present invention, there is provided the color printer engine which can output color image data for a plurality sheets of form by executing a printing operation once, and the memory control unit develops the color image data for a plurality sheets of form inputted by each color component in a memory unit by each color component, so that, when an color printer engine which can output image data for a plurality sheets of form by executing a printing operation once is used, printing can be executed without delaying a time for first print, which enables high speed output of color image data for a plurality sheets of form for printing.

With the color printer according to the present invention, there is provided the color printer engine which can output color image data for a plurality sheets of form for printing in colors by executing a printing operation once, and the memory control unit develops the color image data for a plurality sheets of form having been divided to a plurality of bands in the auxiliary scanning direction with each divided band inputted by each color component in a memory unit by each color component, so that, when color image data for a plurality sheets of form is outputted for printing, the print processing can be simplified by executing the band processing for a plurality of pages in batch, which enables high speed print processing when color image data for a plurality sheets of form can be outputted for printing.

With the color printer according to the present invention, there is provided color printer engine which can output color image data for a plurality sheets of form by executing a printing operation once, and the memory control unit develops color image data for a plurality sheets of form having been divided to display code with the display code inputted for each color component in a memory unit by each color component, so that, when image data for a plurality sheets of form is sent from a host computer to a color printer controller in a display list format for printing, by separating display code for each of text data, image data, and graphic data by each color component, the print processing can be simplified, which enables high speed output of color image data for a plurality sheets of form for printing.

With the color printer according to the present invention, the memory control unit develops color image data inputted by each color component in a memory unit by each color component, and the timing switching unit changes a timing for starting a printing operation of the color printer engine according to a printer start command instructing change of a timing for starting a print processing of the color printer engine, so that it is possible to reduce a frequency of generation of print underrun, and also a printing operation and development of an image can concurrently and efficiently be executed, which enables high speed print processing without generating a print error.

With the computer-readable recording medium with a computer-executable program stored therein according to the present invention, a computer can send color image data by each color component to a color printer by executing a program stored in a recording medium, which enables high speed output of color image data for printing.

With the computer-readable recording medium with a computer-executable program stored therein according to the present invention, a computer converts color image data to data with a format which the color printer can interpret and also which can be printed by the color printer by executing a program stored in a recording medium, and also can send the converted color image data by each color component to the color printer, which enables high speed print processing. This feature is especially effective when the color image data is RGB data.

With the computer-readable recording medium with a computer-executable program stored therein according to the present invention, a computer can divide prepared color image data to a plurality of bands in the auxiliary scanning direction and send the divided bands by each color component to a color printer by executing a program stored in a recording medium, which enables high speed output of color image data for printing.

With the computer-readable recording medium with a computer-executable program stored therein according to the present invention, a computer can convert prepared color image data for a plurality sheets of form to data with a format which the color printer can interpret and send the converted color image data for a plurality sheets of form by each color component to the color printer by executing a program stored in a recording medium, and when applied to a color printer which can print a plurality sheets of form by executing a printing operation once, printing can be executed without delaying a time for first print, which enables high speed output of color image data for a plurality sheets of form for printing.

With the computer-readable recording medium with a computer-executable program stored therein according to the present invention, a computer can convert prepared color image data for a plurality sheets of form to data with a format which a color printer can interpret, divide the color image data to a plurality of bands in the auxiliary scanning direction, and send the divided bands by each color component to the color printer by executing a program stored in a recording medium, and when a plurality sheets of form are printed simultaneously, the print processing is simplified by executing the band processing for a plurality of bands in batch, which enables high speed output of color data for a plurality sheets of form for printing.

With the computer-readable recording medium with a computer-executable program stored therein according to the present invention, a computer can convert prepared color image data for a plurality sheets of form to data with a format which a color printer can interpret, divide the color image data to display code, and send the display code by each color component to the color printer by executing a program stored in a recording medium, so that the print processing is simplified, which enables high speed output of color image data for a plurality sheets of form for printing.

With the computer-readable recording medium with a computer-executable program stored therein according to the present invention, a computer can convert prepared color image data to data with a format which a color printer can interpret, send the converted color image data by each color component to the printer, and also can send a printer start command instructing change of a timing for starting a printing operation of the color printer to the color printer controller according to complexity of the color image data as well as to a printing speed of the color printer engine, which enables high speed print processing without generating a print error.

Other objects and features of this invention will become understood from the following description with reference to the accompanying drawings.

DESCRIPTION OF THE PREFERRED EMBODIMENTS

Next a detailed description is made for embodiments of the color print system according to the present invention with reference to the related drawings.

Figure 1:
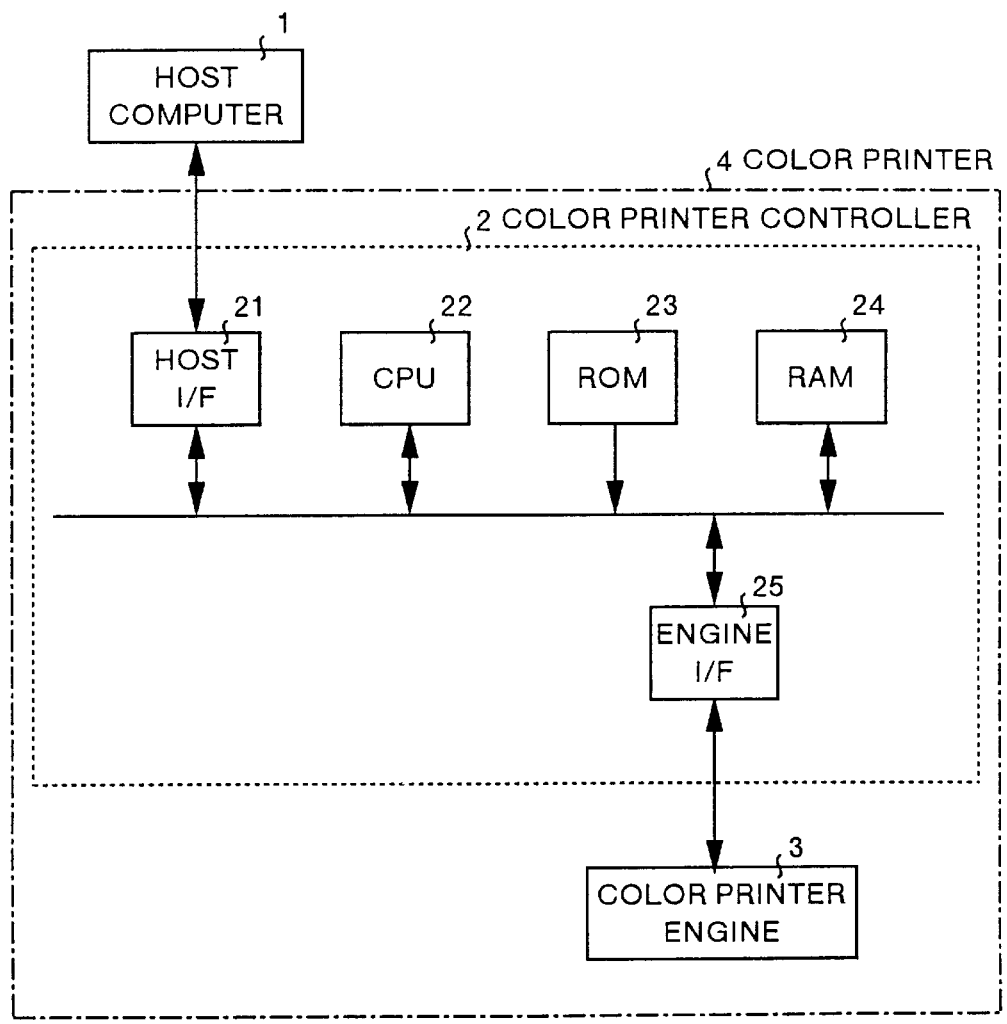
FIG. 1 is a block diagram showing a configuration of a color print system according to an embodiment of the present invention.

FIG. 1 is a block diagram showing a configuration of a color print system according to an embodiment of the present invention.

The color print system shown in FIG. 1 comprises a host computer 1 for preparing color image data for printing, a color printer controller 2 for having the color image data outputted for printing by controlling a color printer engine 3, and a color printer engine 3 for having the color image data outputted for printing in colors. The color printer 4 comprises a color printer controller 2 and a color printer engine 3.

The host computer 1 prepares color image data to be outputted for printing, converts the color image data to data with a format which the color printer controller 2 can interpret, and sends the color image data to the color printer controller 2.

The color printer controller 2 converts the color image data received from the host computer 1 to data with a format which can be outputted for printing by the color printer engine 3, then develops the converted image data in a RAM 24, then sends the color image data to the color printer engine 3 by executing a video DMA operation, and has the color image data outputted for printing.

The color printer engine 3 has the color image data sent from the color printer controller 2 outputted for printing in colors.

Next description is made for specific configuration of the color print system (host computer 1, color printer controller 2, printer engine 3) discretely.

Figure 2:
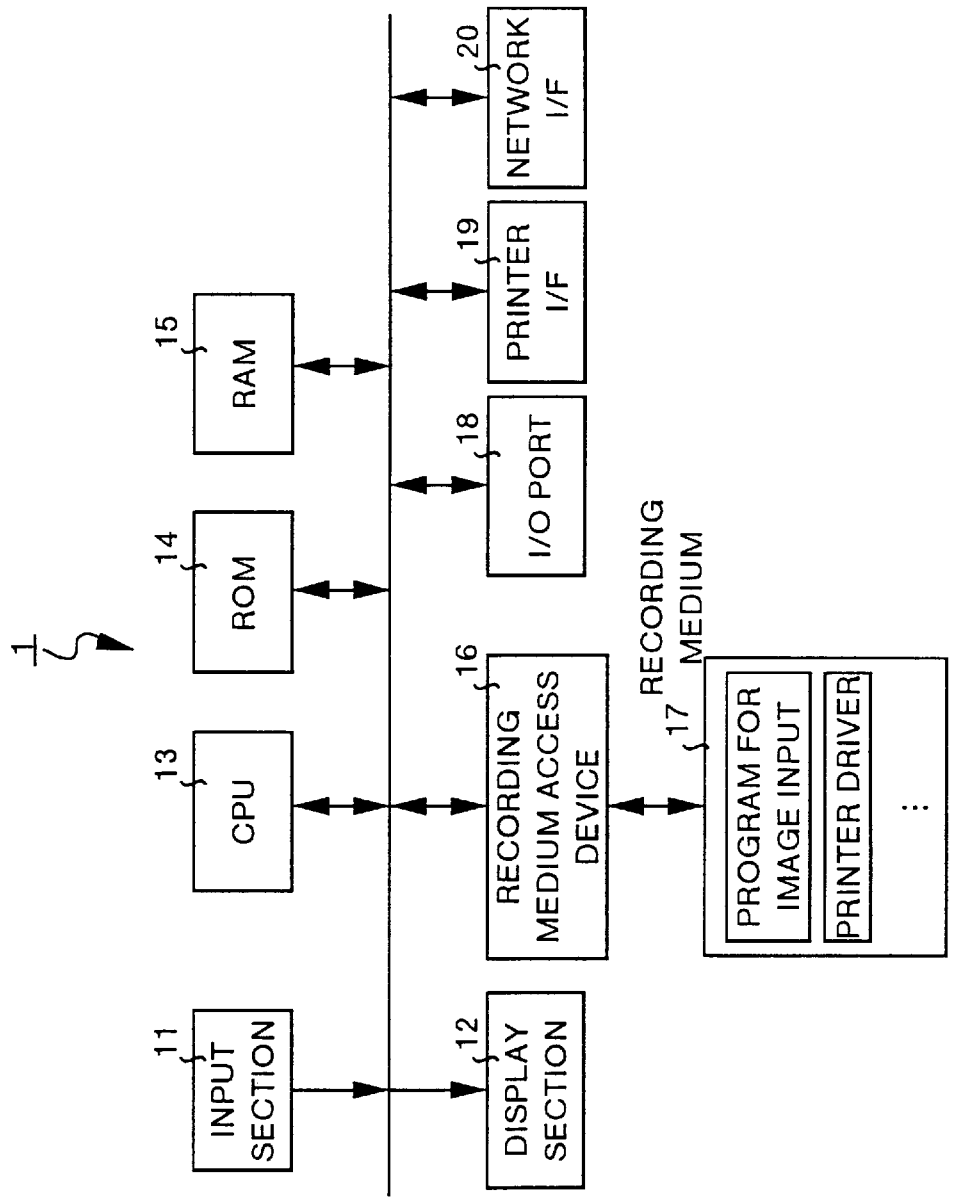
FIG. 2 is a block diagram showing a configuration of a host computer in FIG. 1.

FIG. 2 is a block diagram showing a general configuration of the host computer 1.

The host computer 1 comprises a input section 11 for inputting color image data or the like not shown herein, a display section 12 for displaying the inputted image or the like, a CPU 13 for controlling the entire host computer, a ROM 14 for storing therein various types of program or the like for running the CPU 13, a RAM 15 used as a work memory for the CPU 13, a recording medium access device 16 for reading data from or writing data in a recording medium 17, a recording medium 17 for storing therein a program for running the CPU 13 or the like, and an I/O port 18, a printer I/F 19, a network I/F 20 each for data communications.

The input section 11 comprises, for instance, a scanner for fetching an image as image data with a prespecified format (not shown), a keyboard for entering character code such as characters or signs (not shown), and a mouse for inputting coordinate data or a specified command when preparing and editing diagram data (not shown).

The display section 12 comprises a CRT and an LCD, and provides displays according to display data inputted from the CPU 13.

The CPU 13 is a control unit for controlling the host computer 1 as a whole according to various types of program stored in the ROM 14 or the recording medium 17. The CPU 13 has the input section 11, display section 12, RAM 15, recording medium access device 16, I/O port 18, printer I/F 19, and network I/F 20 or the like each connected thereto, and provides controls over data communications, operation for reading out program by means of access to a memory (ROM 14, RAM 15) or recording medium access device 16, operations for reading or writing various types of data, operations for inputting data or commands, and other operations.

The ROM 14 stores therein a system program for running a CPU, application programs, and parameters for a device driver or those used in other processing. Application programs include, for instance, a program for image input, and the device drivers include a printer driver. These programs are stored as program code, which the CPU 13 can read, in the ROM 14.

Stored in the recording medium 17 are application programs executable by the CPU 13, device drivers, or the like. The application program include, for instance, an program for image input, and the device drivers include a printer driver. The recording medium 17 is an optical, magnetic, or electric recording medium such as a floppy disk, a hard disk, a CD-ROM, a DVD-ROM, an MO, or a PC. The programs as described above are stored with a data format readable to the CPU 13 in the recording medium. Sometimes the various types of program may be previously stored in a recording medium or downloaded via a communication line and stored in a recording medium.

The printer driver is software for the CPU 13 to output a different print command or print data for each printer, and for instance, the CPU 13 executes the printer driver to convert color image data for printing to color image data for printer output suited to each printer (for instance, processing for converting RGB color image data to CMYK color image data, and processing for dividing color image data to a plurality of bands).

The RAM 15 stores therein a specified program, a result of processing, received color image data, or the like.

The I/O port 18, printer I/F 19, and network I/F 20 are used for data communications, and are connected for instance to the host I/F 21 of the color printer controller 2 to execute data communications with the color printer controller 2.

Next a description is made for the color printer 4. At first, the color printer controller 2 comprises, as shown in FIG. 1, a host I/F 21 for executing data communications with the host computer 1, a CPU 22 for controlling operations of each section of the color printer controller 2, a ROM 23 for storing therein a control program for running the CPU 22, a RAM 24 used as a work area of the CPU 22, and an engine I/F 25 for executing data communications with the color printer engine 3.

The host I/F 21 receives color image data sent from the host computer 1 and stores the received color image data in a receiving buffer therein (The receiving buffer may not be provided therein, and the RAM 24 may be used for that purpose).

The CPU 22 is a central control unit for controlling operations of each section according to the control program stored in the ROM 23. Connected to this CPU 22 are the host I/F 21, ROM 23, RAM 24, and engine I/F 25, and the CPU 22 provides controls over data communications or a printing operation by the color printer engine 3.

The ROM 23 stores therein a control program for running the CPU 22, parameters used for the processing, or the like. The various types of control programs are stored as program code readable to the CPU 22 in the ROM 23.

The RAM 24 stores therein a specified control program, a result of processing, received color image data, or the like.

The engine I/F 25 sends the color image data stored in the RAM 24 to the color printer engine 3 by executing a DMA operation for having the color image data printed.

The color printer engine 3 is a unit for actually executing a printing operation in the color printer, and has the color image data printed under controls by the color printer controller 2.

Next a description is made for a printing operations in the print system described above.

Figure 3:
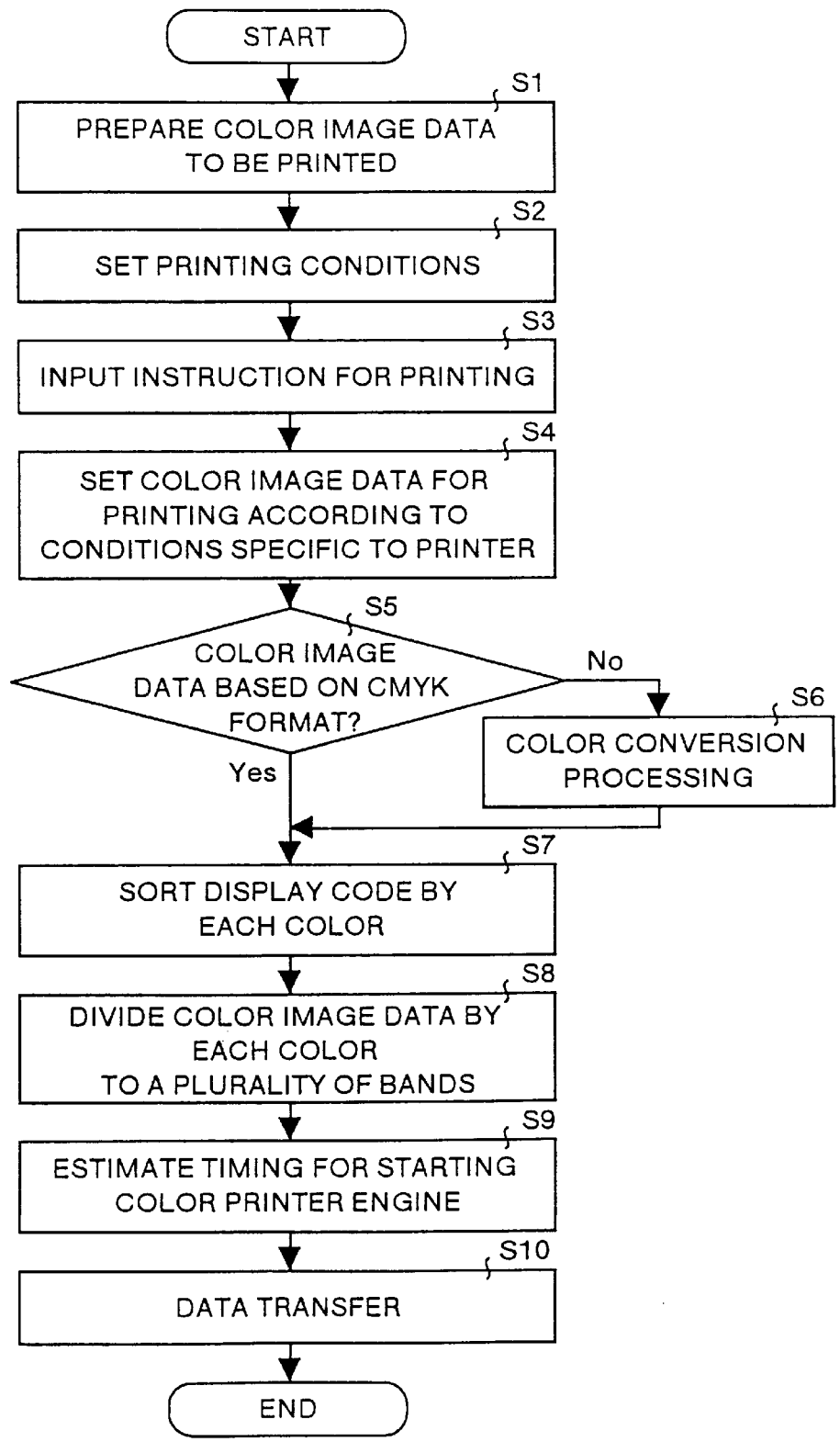
FIG. 3 is a flow chart showing operations of the host computer.

At first, a description is made for operations of the host computer 1 with reference to the flow chart in FIG. 3. FIG. 3 is a flow chart showing operations of the host computer 1.

At first, in the host computer 1, the CPU 13 starts operations of an application program for image input in response to an instruction for input by a user. Then, color image data to be printed is prepared on this application program according to an input operation in the input section 11 by the user (step S1). Then printing conditions (such parameters as the number of forms to be printed, the number of pages, resolution) are set on this application program according to an input operation by the user in the input section 11 (step S2), and further when an instruction for printing is input according to an input operation by the user in the input section 11 (step S3), the CPU 13 executes the processing from step S4 to step S10 under controllers by the printer control.

At first, in step S4, the CPU 13 sets color image data for printing according to conditions specific to a printer such as a resolution of a color printer connected thereto, or device fonts prepared in the color printer controller. Then the CPU 13 determines whether the color image data to be outputted for printing is based on the CMYK format or not (step S5), and if it is determined that the color image data is not based on the CMYK format (step S5) and is based on the RGB format, the CPU 13 converts a format of the color image data from the RGB format to the CMYK format (step S6).

Then the CPU 13 sorts display code by each color component (step S7) and divides the color image data by each color component to a plurality of bands (N bands) (step S8). More specifically, each data for K, C, M, Y is divided to bands 1 to N (N: integer of 2 or more).

Figure 7:
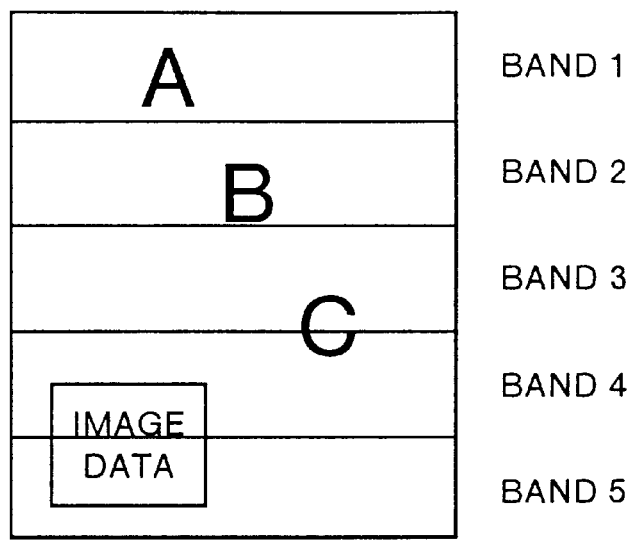
FIG. 7 is an explanatory view for explaining an example of a specific operation of the color print system shown in FIG. 1.
Figure 8:
FIG. 8 is an explanatory view for explaining an example of a specific operation of the color print system shown in FIG. 1.

To described more detailedly, sometimes it may occur that the RAM 24 can not be acquired as a continuous image data area inside the color printer controller 2. In contrast, a timing of video DMA output from the color printer controller 2 to the color printer engine 3 is delayed when a continuous image data area is not acquired, so that an image area is divided to a plurality of bands in the auxiliary scanning direction. So color image data is divided to bands and the bands are sent out when the host computer 1 outputs color image data. In this step, KCMY color image data is separated to plains for color components and each plain is divided to bands (as shown in FIG. 7, FIG. 8) so that processing can be executed by each color component by the color printer controller 2.

Then the CPU 13 estimates a timing for starting the color printer engine 3 taking into account complicity of color image data or a printing speed of the color printer engine 3 (step S9). More specifically, the CPU 13 makes the color printer engine execute a printing operation taking into account a capacity of color image data not having been transferred or complexity of graphic data, and at the same time estimates whether a printing speed of the color printer engine 3 can be followed or not even when the color image data is developed by the color printer controller 2 in the RAM 24.

To described more detailedly, the host computer 1 (printer driver) computes a complicity of image data to decide a timing for starting a printing operation of the color printer engine 3 according to such parameters as the number of characters in test data included in the color image data to be outputted for printing, the number of bytes of the image data, a the number of complicated paths of graphic data, a length of a test written with a font for which a device font does not exist to be downloaded from the host computer 1. Then, the host computer 1 (printer driver) makes it possible to concurrently execute a printing operation and development of color image data with the color print controller 2 substantially without generating printer underrun by estimating whether development of image data for a next color component can be made or not while printing for a color component is printed by the color printer engine 3.

For instance, if the color printer engine 3 requires 4 seconds for outputting image data for one color, a transfer speed from the host computer 1 to the color printer controller 2 is 100 KB, and the number of characters in a test to be transferred is 10,000 characters, a time required for transferring the test data and a time for development of the image data are shorted than a time required for outputting image data for the one color, and in this case, it is determined that there is enough time for development of image data for a next color component even if a printing operation is started first.

Then the CPU 13 sends converted color image data by each color component and also by each band to the color printer controller (step S10). In this case, if it is determined in step S9 that a printing speed of the color printer engine can be followed even when image data is developed by the color printer controller 2 in the RAM 24 during printing, a printer start command for instructing start of the color printer engine 3 is outputted to the color printer controller 2.

It should be noted that, if the connected color printer engine 3 is based on the electronic photographing system and 4 colors of C, M, Y, K are superimposed to each other in printing, when the printing order is in the order of K, C, M, Y (This order is decided according to a descending order of color reproducibility in a color printer engine, and is not always limited to this order), the host computer 1 (printer driver) sends color image data in the order of K, C, M and Y for printing.

Next a description is made for operations of the color printer controller 2 (Refer to FIG. 1).

In the color printer controller 2, at first the host I/F 21 receives color image data sent from the host computer 1 and stores the color image data temporally in a receiving buffer therein, and then generates an interrupt to the CPU 22 and reports that a print instruction has been issued from the host computer 1.

Then the CPU 22 temporally stores the color image data received by the host I/F 21 in the RAM 24, and develops the color image data on the RAM 24 as image data which can be outputted for printing. In this case, the color image data received from the host computer 1 includes text data, image data, and graphic data, and develops the color image data by each color component on the RAM 24.

Then, when color image data for one color component or for a plurality of color components has been developed on the RAM 24, the CPU 22 issues a print start instruction via the engine I/F 25 to the color printer engine 3 to start printing for a color component of K, and at the same times starts development of color image data for a next color component on the RAM 24, thus a video DMA operation and development of image data is executed concurrently.

As described above, the same processing is executed for a next color component of C, and when the processing is executed for a final color component of Y, as there is no color image data to be developed in a case where an image is printed only on one sheet, only the video DMA operation for Y is executed, while, in a case where printing is executed on a plurality sheets, the video DMA operation for Y and development of a color component of K for the next page are executed concurrently. Also when image data for a plurality sheets is outputted for printing, color image data developed once may be outputted for video DMA several times, so that the current processing is not executed.

Also when image processing is executed with a display list format, color image data is processed by each color component. At first in the host computer 1 (print driver), when display code is divided to density data for each color, only those having a color component is prepared as display code, which is transferred to the color printer controller 2 in a form including little redundancy, and the color printer controller 2 develops the display list by each color in the RAM 24.

It should be noted that, when the CPU 22 receives a printer start command from the host computer 1 while developing image data, the CPU 22 issues a print start instruction to the color printer engine 3 at a point of time when development of color image data having been transferred up to the point is finished to execute the video DMA processing for printing, and also continues development of subsequent image data. With this feature, it becomes possible to concurrently execute a printing operation and development of image data, which enables high speed print processing without generating a print error.

FIGS. 4A to 4D are views showing an example of a timing for development of color image data by the color printer controller 2 in the RAM 24 and an example of a timing for a printing operation by the printer engine 3.

Figure 4:
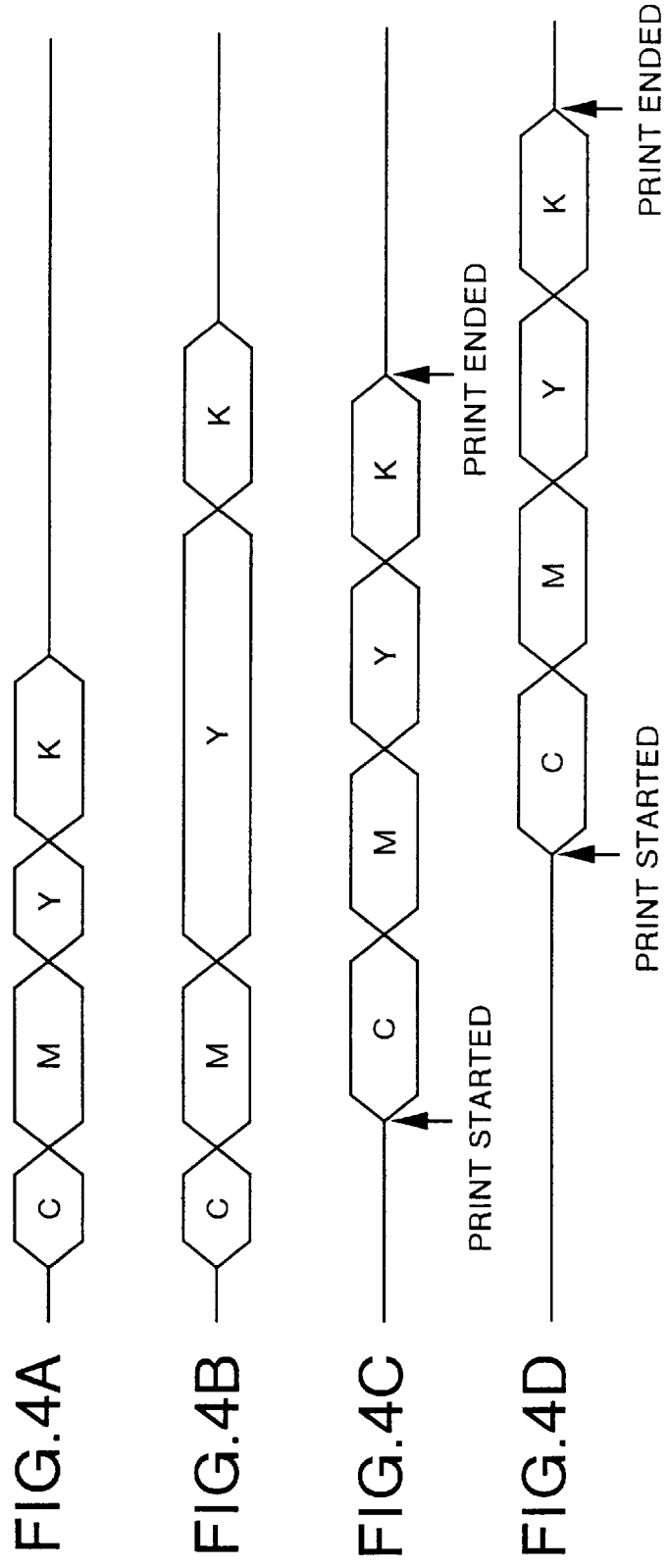
FIGS. 4A to 4D are views showing an example of a timing for development of color image data in a RAM and an example of a timing for a printing operation of a printer engine in a color printer controller.

FIG. 4A shows an first example of development of color image data in the RAM 24, FIG. 4B shows a second example of development of color image data in the RAM 24, FIG. 4C shows a first example of a timing for outputting color image data for printing by the printer engine 3, and FIG. 4D shows a second example of a timing for outputting color image data for printing by the printer engine 3.

As shown in FIGS. 4A to 4D, development of color image data in the RAM 24 and output of the color image data for printing by the printer engine 3 are executed in the order of C, M, Y and K. At first, when color image data is developed in the RAM 24 at the timing for development of color image data as shown in FIG. 4A, after color image data for a first color component in the RAM 24 is finished, the color printer controller 2 issues a print instruction to the printer engine 3 in response to a printer start command sent from the host computer 1, and has a printing operation executed at the timing for printing shown in FIG. 4C. In this case, after all the color image data for C, M, Y and K has been developed in the RAM 24, output of the color image data for C, M, Y and K for printing is started, so that data output from the RAM 24 to the printer engine 3 can appropriately be executed.

In contrast, when color image data is developed in the RAM 24 at the timing for development of image data shown in FIG. 4B, if the color printer controller 2 outputs a print instruction to the printer engine 3 to have a printing operation executed at the timing for printing shown in FIG. 4C after development of color image data for a first color in the RAM 24 is finished, output of image data for a color component of Y is started by the printer engine 3, so that data output from the RAM 24 to the printer engine 3 is delayed and a print error is generated.

With the present invention, as described above, the host computer 1 estimates a time required for development of color image data in the RAM 24 according to complicity of the color image data, and sends out a printer start command instructing a timing for starting a printing operation of the color printer engine 3 to the printer controller 2 further taking into account of a printing speed of the color printer engine 3. Namely, when color image data is developed in the RAM 24 at the timing for development of image data shown in FIG. 4B, the color printer controller 2 outputs a print instruction to the printer engine 3 in response to a printer start command sent from the host computer 1 and has a printing operation executed at the timing for printing shown in FIG. 4D. In this case, output for image data for Y is executed after image data for Y has been developed in the RAM 24, so that a print error is not generated.

Next a description is made for an example of specific operations of the print system with reference to FIG. 5 to FIG. 13.

Figure 5:
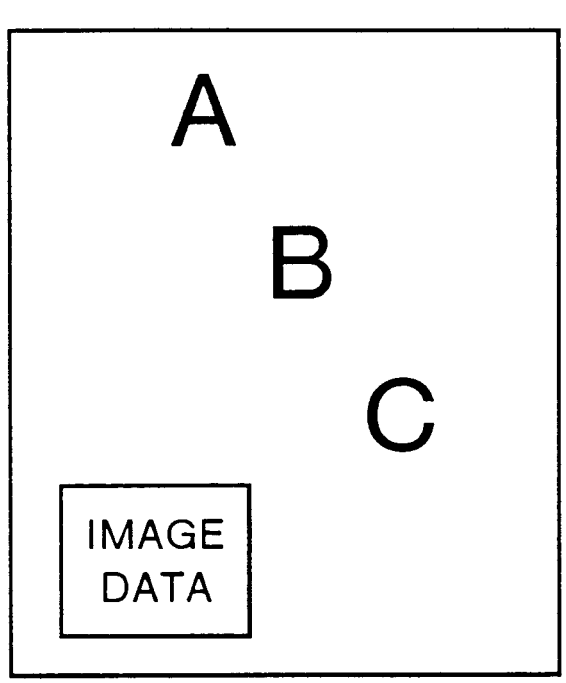
FIG. 5 is an explanatory view for explaining an example of a specific operation of the color print system shown in FIG. 1.

At first, description is made for operations for outputting the color image data as shown in FIG. 5 for printing. It is assumed herein that a density of character "A" is 30/255 for K, 10/255 for C, 100/255 for M, and 30/255 for Y, a density of character "B" is 0/255 for K, 100/255 for C, 100/255 for M, and 0/255 for Y, a density of character "C" is 200/255 for K, 0/255 for C, 0/255 for M, and 0/255 for Y. Also it is assumed therein that the image data has a different density for each pixel. Further it is assumed that a sheet size used is A4 and 4 copies of an image is to be printed. It should be noted that, in the example shown in FIG. 5, the image density is expressed with 8 bits for one pixel (256 grades from 0 to 255), but the number of grades is not limited to this number in the present invention.

In the host computer 1, on an application program for image input, the color image data as shown in FIG. 5 is prepared as color image data to be outputted for printing in response to an input operation in the input section 11 by a user (step S1), and A4 is specified as a form size, 4 copies as the number of forms to be printed, and 1 page as the number of pages (step S2), and further an print instruction is inputted in response to an input operation in the input section by the user (step S3).

Then the color image data to be outputted for printing is set by a printer driver according to such parameters as a resolution of a connected color printer, and device fonts prepared in a color printer controller (step S4).

Figure 6A:
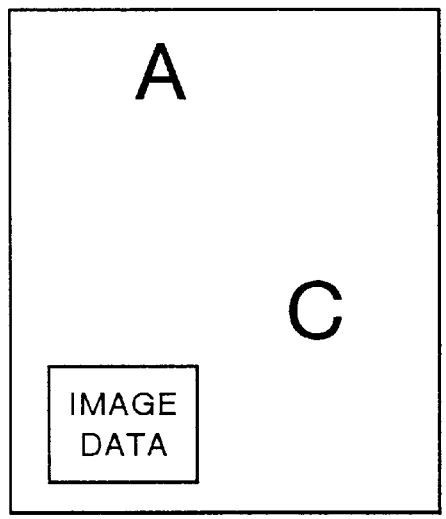
FIGS. 6A to 6D are explanatory views for explaining an example of a specific operation of the color print system shown in FIG. 1.
Figure 6B:
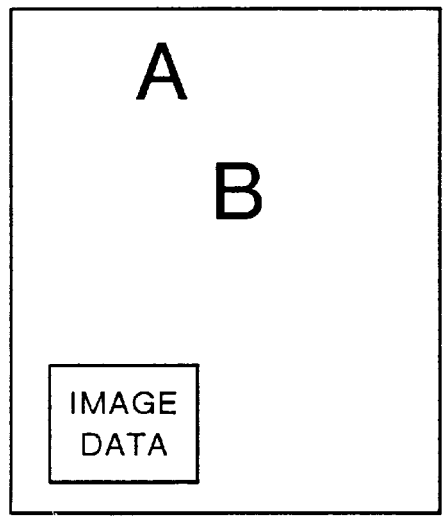
Figure 6C:
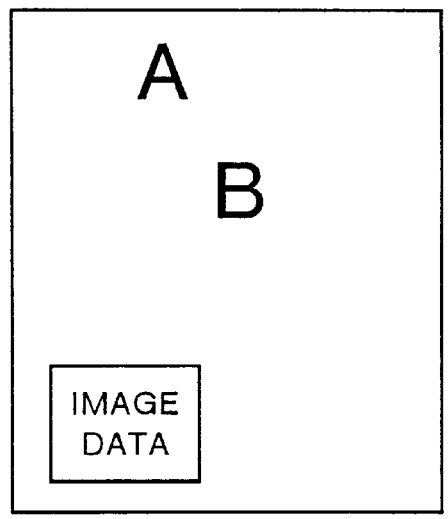
Figure 6D:
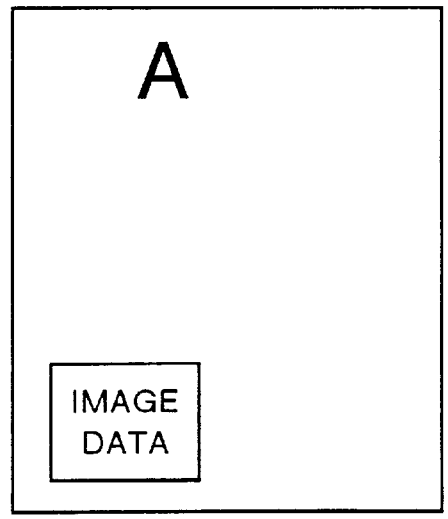

Then in the printer driver, determination is made as to whether the color image data is those based on the CMYK format or not (step S5). In the example shown in FIG. 5, the image data is based on the CMYK format, so that processing is executed using this value. Then, the CMYK color image data is separated to each color component of CMYK as shown in FIG. 6A to FIG. 6D. Then, as shown in FIG. 6A, a character having no corresponding color component such as "B" in K data is ignored because the character is not required to be printed out.

Then the color image data separated to each color component is, as shown in FIG. 7, divided to a plurality of bands (1 to 5) in the auxiliary scanning direction.

Next a description is made for K as a representative of color image data. Each display code in each of the divided band ("A", "C", and "image data" in the example shown in FIG. 6A) is, as shown in FIG. 8, converted to a display list (steps S7, S8 above), and is transferred to the color controller 2 (step S10 above).

In the actual operation, however, as a display list is formed for each band, a display list is formed only for "A" with display code in the band 1. When a font corresponding to an of device fonts prepared in the color printer controller 2 has been registered, the device font is used for the character "A", and when there is no corresponding device font, the image data is developed by the host computer 1, and the developed image data is downloaded to the color printer controller 2.

Figure 9:
FIG. 9 is an explanatory view for explaining an example of a specific operation of the color print system shown in FIG. 1.
Figure 10:
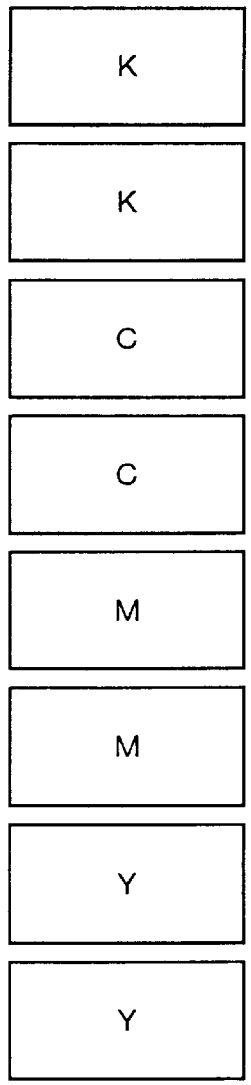
FIG. 10 is an explanatory view for explaining an example of a specific operation of the color print system shown in FIG. 1.

As there is no display code in band 2, as shown in FIG. 9, only end code (EOD: End of Data) for display code is formed. In bands 3, and 4, the character "C" is spread over the two pages. In this case, all the image data for the entire character is downloaded in band 3, or the image data is developed and temporally stored in the RAM 24 in the color printer controller 2, and the latter half is used in band 4.

Although image data exists for all of the colors as shown in FIGS. 6A to 6D, but only image data for each color component is converted to a display code, so that a color without any image data may exist. Thus, the color image data converted to display code is sent out in the order of K, C, M and Y to the color printer controller 2.

Even in a case where printing is executed by a color printer engine and concurrently development of image data is developed by the color controller 2 in the RAM 24, whether a printing speed of the color printer engine 3 can be followed or not is estimated by a printer driver by taking into account a capacity of color image data not transferred yet or complicity of the graphic data, and when it is determined that the printing speed can be followed, also a printer start command is outputted to the color printer controller 2.

In the side of the color printer controller 2, development of image data in the RAM 24 is started from display code in band 1 of band K in the color image data transferred from the host computer 1, then the same processing is executed for band 2 of band K, band 3 of K band, . . . , band N of band K, and when the processing for band K is finished, the same processing is successively executed for each of other color components in the order of C, M and Y.

In the color printer controller 2, when a printer start command is received from the host computer 1 during development of image data, a print start command is outputted to the color printer engine 3 at a point of time when the display code having been transferred thereto up to the point of time is developed with video DMA processing executed, and a printing operation for the color component of K is executed, and at the same time development of subsequent display code is continued.

Next description is made for an example of operations for printing an image on 4 sheets with a size of A4 by using a color printer engine which can print an image on a form with a size of up to A3 and also print a color image on two sheets of form each with a size of A4 (by executing a printing operation once).

It is possible to print an image on two sheets of form each with a size of A4 by executing a full-color printing operation once by means of transferring color image data for a color component of K two times successively to the color printer engine and then transferring image data for each of color components of C, M and Y two times successively. By repeating the processing described above, it becomes possible to concurrently execute transfer of color image data and development of color image data while during an operation for printing an image on a page.

Figure 11A:
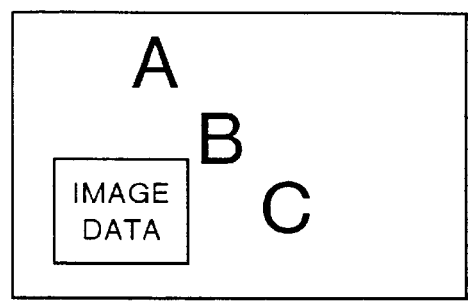
FIGS. 11A and 11B are explanatory views for explaining an example of a specific operation of the color print system shown in FIG. 1.
Figure 11B:
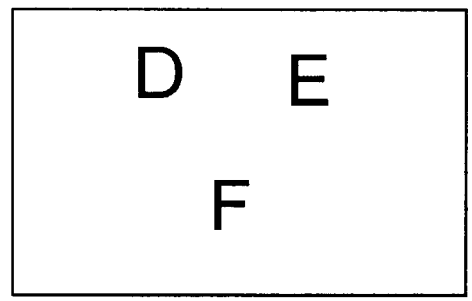
Figure 12:
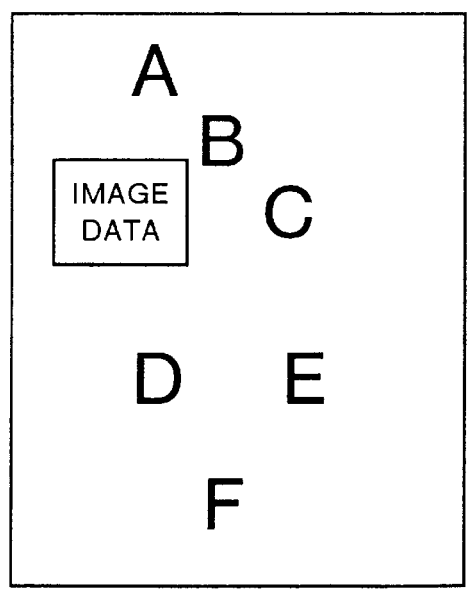
FIG. 12 is an explanatory view for explaining an example of a specific operation of the color print system shown in FIG. 1.

Next a description is made for an example of operations for outputting color image data for a plurality sheets as shown in FIGS. 11A and 11B (for two pages in FIGS. 11A and 11B).

Figure 13:
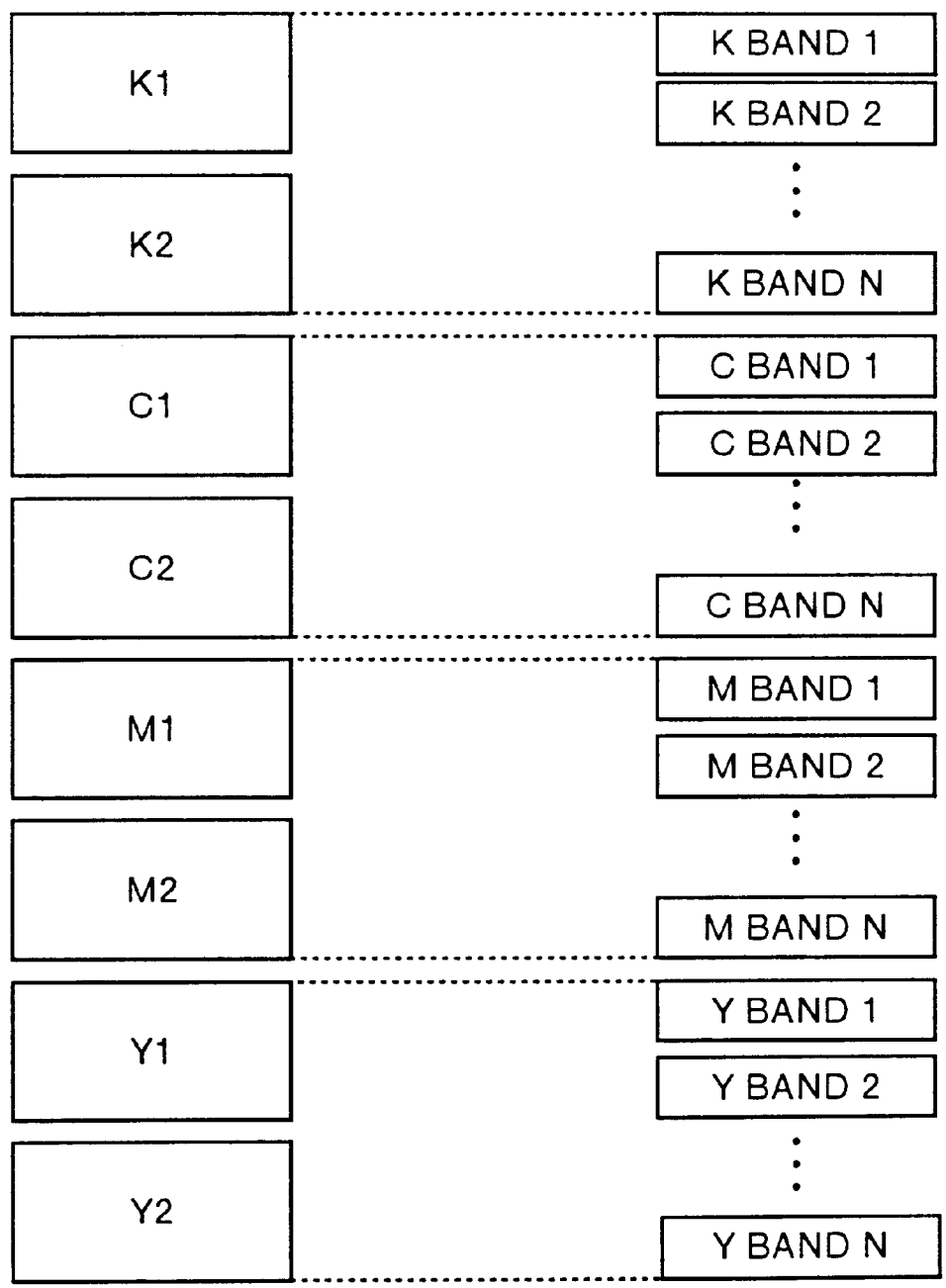
FIG. 13 is an explanatory view for explaining an example of a specific operation of the color print system shown in FIG. 1.
Figure 14:
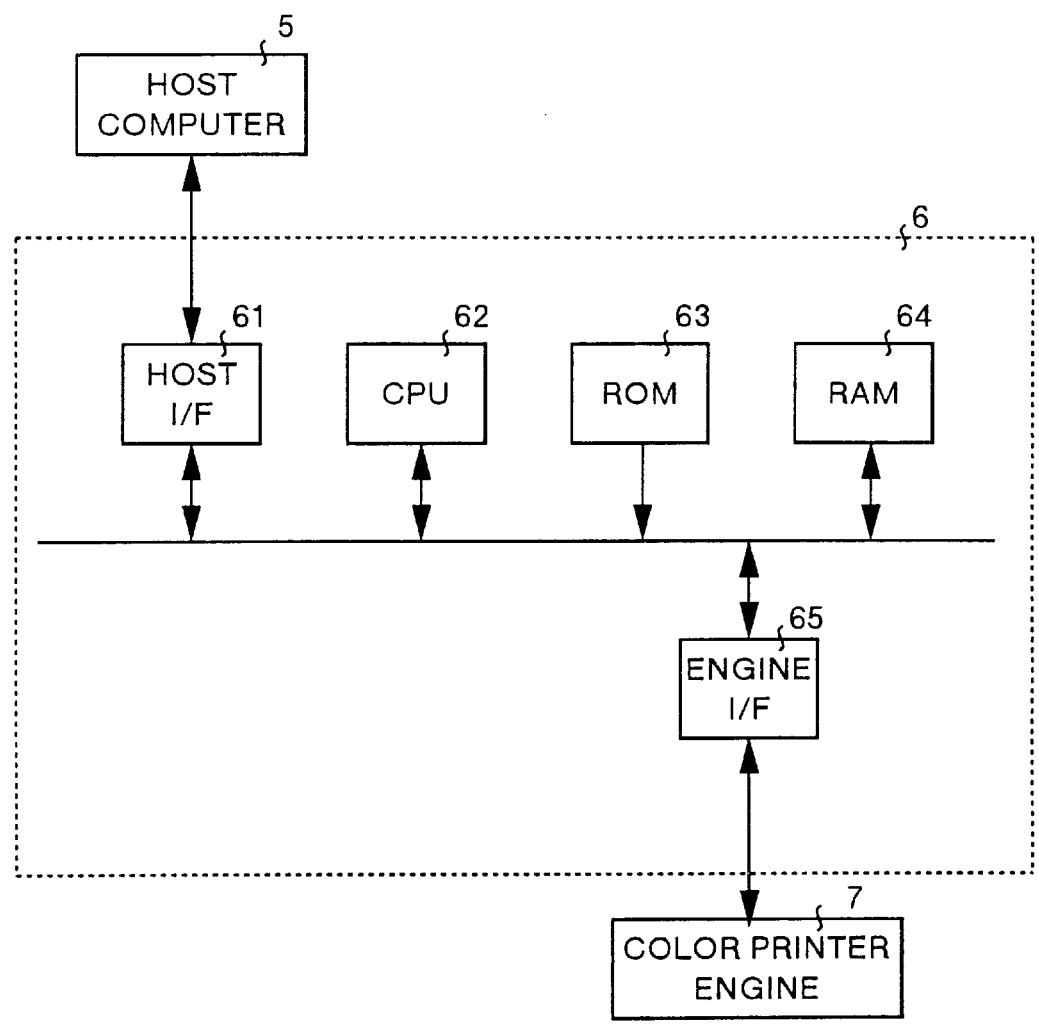
FIG. 14 is a block diagram showing configuration of a color print system based on the conventional technology.
Figure 15:
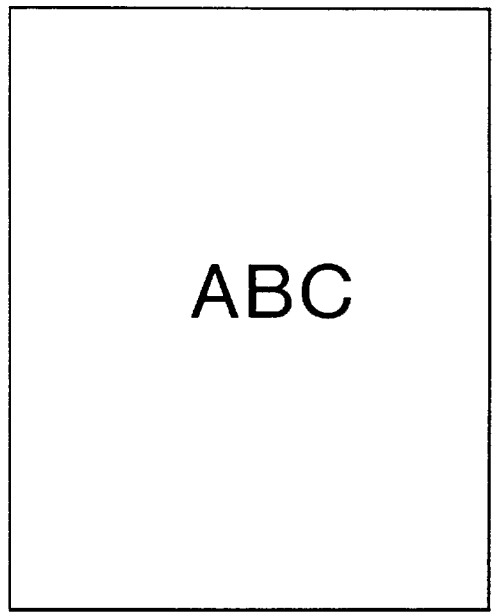
FIG. 15 is an explanatory view for showing an example of data operations of the color print system in FIG. 14.
Figure 16:
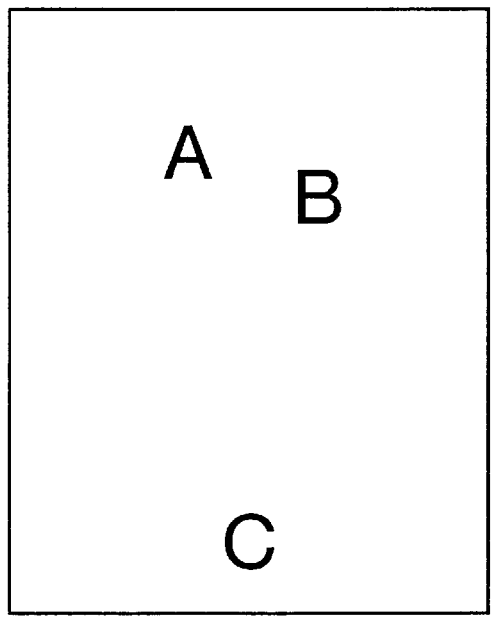
FIG. 16 is an explanatory view showing an example of data for explaining operations of the color print system in FIG. 14.
Figure 17:
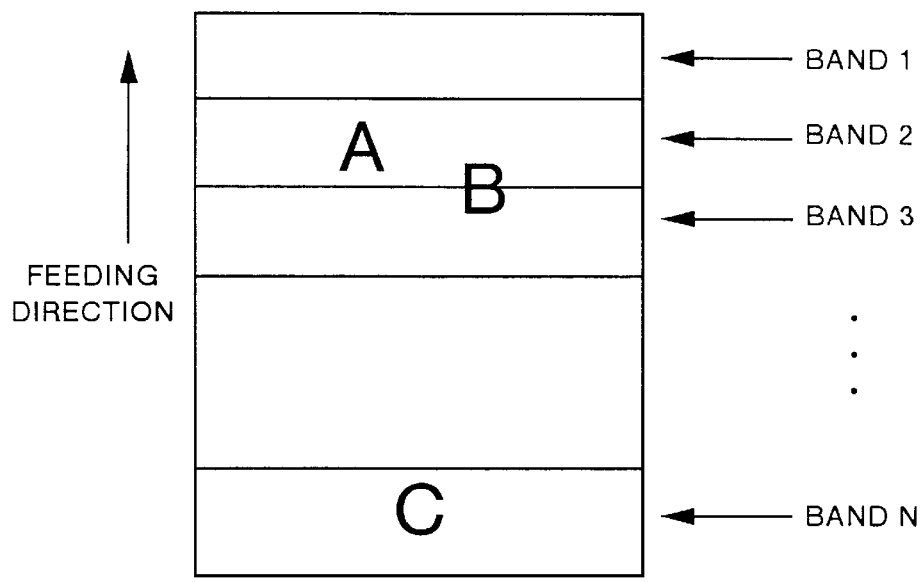
FIG. 17 is an explanatory view showing an example of data for explaining operations of the color print system in FIG. 14.
Figure 18:
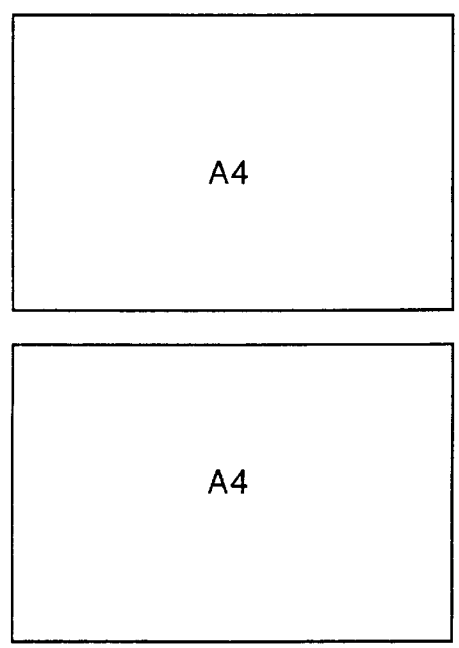
FIG. 18 is an explanatory view showing an example of data for explaining operations for outputting color image data for a plurality sheets of form for printing in the conventional technology.
Figure 19:
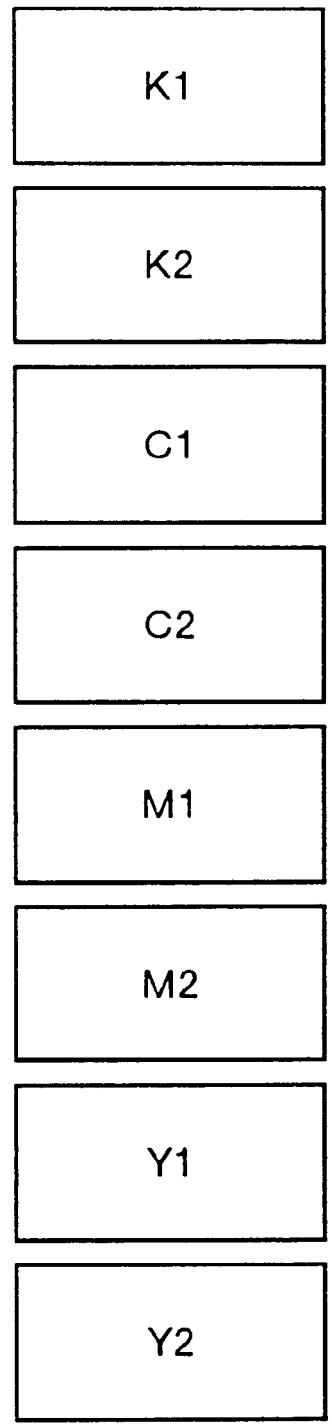
FIG. 19 is an explanatory view showing an example of data for explaining operations for outputting color image data for a plurality sheets of form for printing In the conventional technology.

The color image data for two sheets shown in FIGS. 11A and 11B is treated as a printer driver like color image data for a sheet of form with a size of A3. Namely, as shown in FIG. 13, color image data for a two sheets of form is separated to color components of K, C, M, and Y (color image data for a first sheet of form is separated to K1, C1, M1, Y1, and color image data for a second sheet of form to K2, C2, M2, and Y2), then the color image data for two sheets is combined by each color component to K1·K2, C1·C2, M1·M2, Y1·Y2 to separate the image data to a plurality of bands (K band 1 to K band N, C band 1 to C band N, M band 1 to M band N, Y band 1 to Y band N), and the K band 1 to Y band N are successively transferred to the color printer controller 2. Then the color printer controller 2 develops the color image data received for each band in the RAM 24 by each band, and has the developed color data outputted for printing. In this case, however, the color printer controller 2 notifies the color printer engine 3 that the image is to be printed on two sheets of form each with a size of A4, and then outputs a printing start instruction to the color printer engine 3. Namely by treating color image data for a plurality of pages as color image data for one sheet of form, separating the color image data to those for color components of K, C, M and Y, and processing the image data by each band, it becomes possible to concurrently executing transfer of color image data and development of image data during a printing operation for printing an image on a plurality of pages.

As described above, with this embodiment of the present invention, a printer driver in the host computer 1 sends color image data by each color component to the color printer controller 2, and in the printer controller 2, the CPU 22 develops the received color image data by each color component in the RAM 24, and when development of color image data for one color component or a plurality of color components in the RAM 24 is finished, the CPU 22 sends a printing start instruction via the engine I/F 25 to the color printer engine 3 to start a printing operation, and starts development of image data for a next color component and concurrently executes a video DMA operation for printing and development of image data, so that, at a point of time when color image data for a first color is developed, a printing operation of the color printer engine 3 is executed, and when color image data is outputted for printing by the color printer engine 3, printing for a color and development of image data for a next color to be outputted for printing can concurrently be executed, which enables high speed print processing.

With this embodiment of the present invention, printer driver in the host computer 1 sends color image data by each color component to a color printer controller and also sends a printer start command indicating change of a timing for starting a printing operation of the color printer engine to the color printer controller 2 by taking into account complicity of the color image data and a printing speed of the color printer engine 3, and in the color print controller 2, the CPU 22 develops the received color image data by each color component in a memory unit, and changes a timing for starting a printing operation of the color printer engine 3 according to a printer start command, so that, after the color printer controller 2 has developed image data for each color component, the color printer controller 2 can estimate a timing for issuing a printing start instruction to the color printer engine by taking into account complicity of the color image data to be outputted for printing with a frequency of generation of print underrun reduced and also a printing operation and development of image data can concurrently be executed, which enables high speed print processing without generating a print error.

It should be noted that the present invention is not limited to the embodiment described above, and it is needless to say that various modifications and changes are possible within a gist of the present invention.

This application is based on Japanese patent applications No. HEI 9-102310 and No. HEI 10-093585 filed in the Japanese Patent Office on Apr. 18, 1997 and Apr. 6, 1998, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A color print system comprising:

a host computer configured to prepare color image data to be printed; and a color printer controller configured to print said color image data in colors by controlling a color printer engine, wherein said host computer comprises:

a printer driver unit configured to convert the prepared color image data to data with a format which said color printer controller can interpret and configured to send the converted color image data by each color component to said color printer controller, and wherein said color printer controller comprises:

a memory control unit configured to convert the color image data sent from said printer driver unit to data with a format which can be printed with said color printer engine and configured to develop the color image data for each color component in a memory unit, said memory unit temporally storing the color image data developed by said memory control unit; and an engine interface unit configured to send the color image data developed in said memory unit to said color printer engine by each color component, wherein the host computer estimates a time required for the color printer controller to develop the color image data based on a complexity of the color image data, and wherein the color printer controller transmits a print instruction command to the color printer engine based on 1) the estimated time required for the color printer controller to develop the color image, and 2) a printing speed of the color printer engine.

2. A color print system comprising:

a host computer configured to prepare color image data to be printed; and a color printer controller configured to print said color image data in colors by controlling a color printer engine, wherein said host computer comprises:

a printer driver unit configured to convert the prepared color image data to data with a format which said color printer controller can interpret and with a color format for printing with said color printer engine, and configured to send the converted color image data by each color component to said color printer controller, and wherein said color printer controller comprises:

a memory control unit configured to convert color image data sent from said printer driver unit to data with a format which can be printed by said color printer engine and configured to develop the converted color image data by each color component in a memory unit, said memory unit temporally storing the color image data developed by said memory control unit; and an engine interface unit configured to send the color image data developed in said memory unit by each color component to said color printer engine, wherein the host computer estimates a time required for the color printer controller to develop the color image data based on a complexity of the color image data, and wherein the color printer controller transmits a print instruction command to the color printer engine based on 1) the estimated time required for the color printer controller to develop the color image, and 2) a printing speed of the color printer engine.

3. A color print system comprising:

a host computer configured to prepare color image data to be printed; and a color printer controller configured to print said color image data in colors by controlling a color printer engine, wherein said host computer comprises:

a printer driver unit configured to convert the prepared color image data to data with a format which said color printer controller can interpret, configured to divide the color image data into a plurality of bands in an auxiliary scanning direction, and configured to send the divided bands by each color component to said color printer controller, and wherein said color printer controller comprises:

a memory control unit configured to convert color image data sent from said printer driver unit to data with a format which can be printed by said color printer engine and configured to develop each band by each color component in a memory unit, said memory unit temporally storing color image data developed by said memory control unit; and an engine interface unit configured to send the color image data developed in said memory unit by each color component to said color printer engine, wherein the host computer estimates a time required for the color printer controller to develop the color image data based on a complexity of the color image data, and wherein the color printer controller transmits a print instruction command to the color printer engine based on 1) the estimated time required for the color printer controller to develop the color image, and 2) a printing speed of the color printer engine.

4. A color print system comprising:

a host computer configured to prepare color image data for a plurality of sheets to be printed; and a color printer controller configured to print said color image data in colors in batch by controlling a color printer engine, wherein said host computer comprises:

a printer driver unit configured to convert the prepared color image data for a plurality of sheets to data with a format which said color printer controller can interpret and configured to send the converted color image data for a plurality of sheets by each color components to said color printer controller, and wherein said color printer controller comprises:

a memory control unit configured to convert the color image data for a plurality of sheets sent from said printer driver unit to data with a format which can tee primed by said color printer engine and configured to develop the color image data by each color component in a memory unit, said memory unit temporally storing the color image data developed by said memory control unit; and an engine interface unit configured to send the color image data developed in said memory unit by each color component to said color printer engine, wherein the host computer estimates a time required for the color printer controller to develop the color image data based on a complexity of the color image data, and wherein the color printer controller transmits a print instruction command to the color printer engine based on 1) the estimated time required for the color printer controller to develop the color image, and 2) a printing speed of the color printer engine.

5. A color print system comprising:

a host computer configured to prepare color image data for a plurality of sheets to be printed; and a color printer controller configured to print said color image data in colors in batch by controlling a color printer engine, wherein said host computer comprises:

a printer driver unit configured to convert the prepared color image data for a plurality of sheets to data with a format which said color printer controller can interpret, configured to divide the color image data into a plurality of bands in an auxiliary scanning direction, and configured to send the divided bands by each color component to said color printer controller, and wherein said color printer controller comprises:

a memory control unit configured to convert color image data for a plurality of sheets sent from said printer driver unit to data with a format which can be printed by said color printer engine, and configured to develop the converted color image data by each color component in a memory unit, said memory unit temporally storing the color image data developed by said memory control unit; and an engine interface unit configured to send the color image data developed in said memory unit by each color component to said color printer engine, wherein the host computer estimates a time required for the color printer controller to develop the color image data based on a complexity of the color image data, and wherein the color printer controller transmits a print instruction command to the color printer engine based on 1) the estimated time required for the color printer controller to develop the color image, and 2) a printing speed of the color printer engine.

6. A color print system comprising:

a host computer configured to prepare color image data for a plurality of sheets to be printed; and a color printer controller configured to print said color image data in colors in batch by controlling a color printer engine, wherein said host computer comprises:

a printer driver unit configured to convert the prepared color image data for a plurality of sheets to data with a format which said color printer controller can interpret, configured to divide the color image data into display code, and configured to send the display code by each color component to said color printer controller, and wherein said color printer controller comprises:

a memory control unit configured to convert the color image data for a plurality of sheets sent from said printer driver unit to data with a format which can be printed by said color printer engine and configured to develop the converted color image data by each color component in a memory unit, said memory unit temporally storing the color image data developed by said memory control unit; and an engine interface unit configured to send the color image data developed in said memory unit by each color component to said color printer engine, wherein the host computer estimates a time required for the color printer controller to develop the color image data based on a complexity of the color image data, and wherein the color printer controller transmits a print instruction command to the color printer engine based on 1) the estimated time required for the color printer controller to develop the color image, and 2) a printing speed of the color printer engine.

7. A color printer comprising:

a color printer engine configured to print color image data in colors; and a color printer controller configured to control said color printer engine, wherein said color printer controller comprises:

a memory control unit configured to convert color image data input by each color component with a data format which said color printer controller can interpret to data with a format which can be printed by said color printer engine, and configured to develop the converted color image data by each color component in a memory unit, said memory unit temporally storing the color image data developed by said memory control unit; and an engine interface unit configured to send the color image data developed in said memory unit by each color component to said color printer engine, wherein the color printer controller transmits a print instruction command to the color printer engine based on 1) an estimated time required for the color printer controller to develop the color image based on a complexity of the color image data, and 2) a printing speed of the color printer engine.

8. A color printer comprising:

a color printer engine configured to print color image data printed in colors; and a color printer controller configured to control said color printer engine, wherein said color printer controller comprises:

a memory control unit configured to convert color image data having been converted to data with a format which said color printer controller can interpret and also which can be printed by said color printer engine and input thereto by each color component to data with a format which can be printed by said color printer engine, and configured to develop the converted color image data by each color component in a memory unit, said memory unit temporally storing the color image data developed by said memory control unit; and an engine interface unit configured to send color image data developed in said memory unit by each color component to said color printer engine, wherein the color printer controller transmits a print instruction command to the color printer engine based on 1) an estimated time required for the color printer controller to develop the color image based on a complexity of the color image data, and 2) a printing speed of the color printer engine.

9. A color printer comprising:

a color printer engine configured to print color image data in colors; and a color printer controller configured to control said color printer engine, wherein said color printer controller comprises:

a memory control unit configured to convert color image data having been converted to data with a format which said color printer controller can interpret, said color image data divided into a plurality of bands in an auxiliary scanning direction with the divided bands input by each color component to data with a format which can be printed by said color printer engine, and configured to develop each of the bands by each color component in a memory unit, said memory unit temporally storing the color image data developed by said memory control unit; and an engine interface unit configured to send the color image data developed in said memory unit by each color component to said color printer engine, wherein the color printer controller transmits a print instruction command to the color printer engine based on 1) an estimated time required for the color printer controller to develop the color image based on a complexity of the color image, and 2) a printing speed of the color printer engine.

10. A color printer comprising:

a color printer engine configured to print color image data for a plurality of sheets by executing a printing operation once; and a color printer controller configured to control said color printer engine, wherein said color printer controller comprises:

a memory control unit configured to convert the color image data for a plurality of sheets having been converted to data with a format which said color printer controller can interpret and inputted thereto by each color component to data with a format which can be printed by said color printer engine, and configured to develop the converted color image data by each color component in a memory unit, said memory unit temporally storing the color image data developed by said memory control unit; and an engine interface unit configured to send the color image data developed in said memory unit by each color component to said color printer engine, wherein the color printer controller transmits a print instruction command to the color printer engine based on 1) an estimated time required for the color printer controller to develop the color image based on a complexity of said color image, and 2) a printing speed of the color printer engine.

11. A color printer comprising:

a color printer engine configured to print color image data for a plurality of sheets by executing a printing operation once; and a color printer controller configured to control said color printer engine, wherein said color printer controller comprises:

a memory control unit configured to convert color image data for a plurality of sheets having been converted to data with a format which said color printer controller can interpret, said color image data being divided into a plurality of bands in an auxiliary scanning direction with the divided bands input by each color component, to data with a format which can be printed by said color printer engine, and configured to develop the converted color image data by each color component in a memory unit, said memory unit temporally storing the color image data developed by said memory control unit; and an engine interface unit configured to send the color image data developed in said memory unit by each color component to said color printer engine, wherein the color printer controller transmits a print instruction command to the color printer engine based on 1) an estimated time required for the color printer controller to develop the color image based on a complexity of the color image, and 2) a printing speed of the color printer engine.

12. A color printer comprising:

a color printer engine configured to print color image data for a plurality of sheets by executing a printing operation once; and a color printer controller configured to control said color printer engine, wherein said color printer controller comprises:

a memory control unit configured to convert color image data for a plurality of sheets having been converted to data with a format which said color printer controller can interpret, said color image data being divided into display code with the display code input by each color component, to data with a format which can be printed by said color primer engine, and configured to develop the converted color image data by each color component in a memory unit, said memory unit temporally storing the color image data developed by said memory control unit; and an engine interface unit configured to send the color image data developed in said memory unit by each color component to said color printer engine, wherein the color printer controller transmits a print instruction command to the color printer engine based on 1) an estimated time required for the color printer controller to develop the color image based on a complexity of the color image, and 2) a printing speed of the color printer engine.

13. A computer-readable recording medium with a computer-executable program stored therein, wherein said computer-readable recording medium has a program for making a computer realize a function for converting prepared color image data to data with a format which a color printer can interpret, for sending the converted color image data by each color component to said color printer and for sending a print instruction command to the color printer engine based on 1) an estimated time required to develop the color image based on a complexity of the color image, and 2) a printing speed of the color printer.

14. A computer-readable recording medium with a computer-executable program stored therein, wherein said computer-readable recording medium has a program for making a computer realize a function for converting prepared color image data to data with a format which a color printer can interpret and also which can be printed by said color printer, for sending the converted color image data by each color component to said color printer and for sending a print instruction command to the color printer engine based on 1) an estimated time required to develop the color image based on a complexity of the color image, and 2) a printing speed of the color printer.

15. A computer-readable recording medium with a computer-executable program stored therein, wherein said computer-readable recording medium has a program for making a computer realize a function for converting prepared color image data into data with a format which a color printer can interpret, for dividing the converted color image data to a plurality of bands in an auxiliary scanning direction, for sending the divided bands by each color component to said color printer and for sending a print instruction command to the color printer engine based on 1) an estimated time required to develop the color image based on a complexity of the color image, and 2) a printing speed of the color printer.

16. A computer-readable recording medium with a computer-executable program stored therein, wherein said computer-readable recording medium has a program for making a computer realize a function for converting prepared color image date for a plurality of sheets to data with a format which a color printer can interpret, for sending the converted color image data for a plurality of sheets by each color component to said color printer and for sending a print instruction command to the color printer engine based on 1) an estimated time required to develop the color image based on a complexity of the color image, and 2) a printing speed of the color printer.

17. A computer-readable recording medium with a computer-executable program stored therein, wherein said computer-readable recording medium has a program for converting the prepared color image data for a plurality of sheets to data with a format which a color primer can interpret, for dividing the converted color image data into a plurality of bands in an auxiliary scanning direction, for sending the divided bands by each color component to said color printer and for sending a print instruction command to the color printer engine based on 1) an estimated time required to develop the color image based on a complexity of the color image, and 2) a printing speed of the color printer.

18. A computer-readable recording medium with a computer-executable program stored therein, wherein said computer-readable recording medium has a program for making a computer realize a function to convert the prepared color image data for a plurality of sheets to data with a format which a color printer can interpret, for dividing the converted color image data into display code, for sending the display code by each color component to said color printer and for sending a print instruction command to the color printer engine based on 1) an estimated time required to develop the color image based on a complexity of the color image, and 2) a printing speed of the color printer.

* * * * *

UNITED STATES PATENT AND TRADEMARK OFFICE
CERTIFICATE OF CORRECTION

PATENT NO. : 6,049,394

DATED : April 11, 2000

INVENTOR(S): Tokutaro FUKUSHIMA

It is certified that an error appears in the above-identified patent and that said Letters Patent is hereby corrected as shown below:

On the title page, item [54] and on top of column 1, the title should read as follows:

--[54] COLOR PRINT SYSTEM, COLOR PRINTER, AND A COMPUTER
READABLE-RECORDING MEDIUM WITH A COMPUTER-
EXECUTABLE PROGRAM STORED THEREIN--

Signed and Sealed this

Tenth Day of April, 2001

*Attest:*

NICHOLAS P. GODICI

*Attesting Officer*   *Acting Director of the United States Patent and Trademark Office*